T. BROWN.
TRANSMISSION GEARING.
APPLICATION FILED JAN. 4, 1907.
1,052,883.
Patented Feb. 11, 1913.
2 SHEETS—SHEET 1.
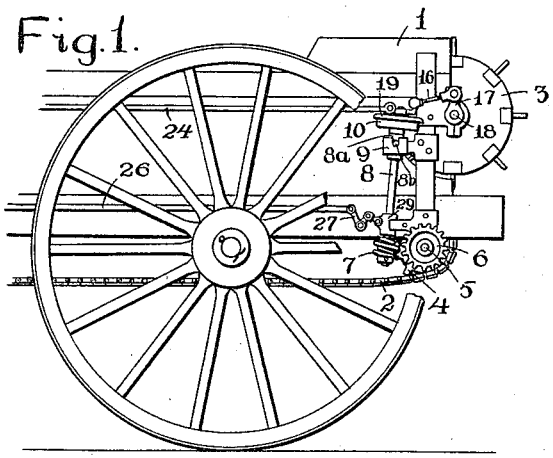
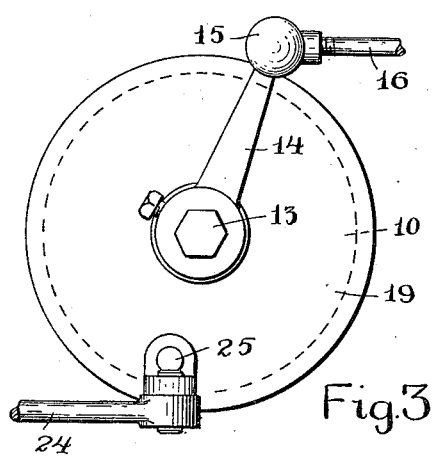
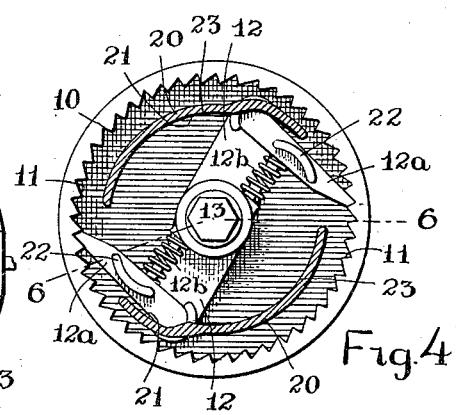
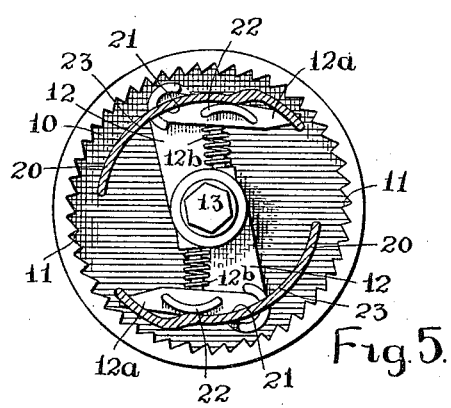
Witnesses
B. D. Tolman.
Penelope Comberbach.
Inventor
Theophilus Brown.
By Rufus B Fowler
Attorney T. BROWN.
TRANSMISSION GEARING.
APPLICATION FILED JAN. 4, 1907.
1,052,883.
Patented Feb. 11, 1913.
2 SHEETS—SHEET 2.
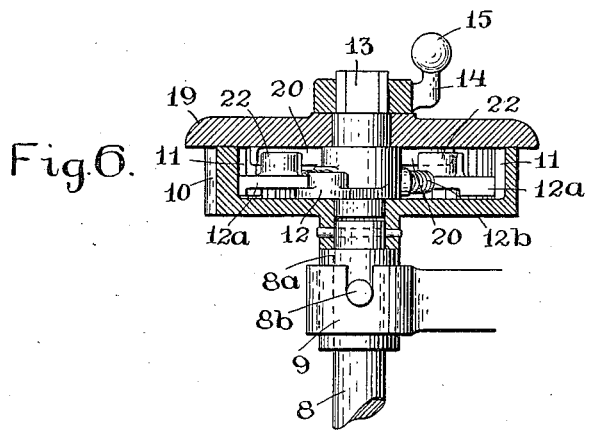
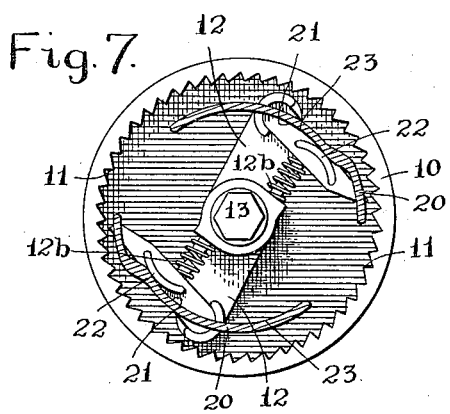
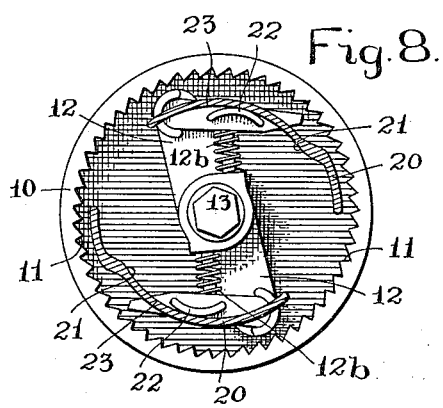
Witnesses
B. D. Tolman
Penelope Comberbach
Inventor
Theophilus Brown.
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

TRANSMISSION-GEARING.

1,052,883.   Specification of Letters Patent.   Patented Feb. 11, 1913.

Application filed January 4, 1907. Serial No. 350,714.

*To all whom it may concern:*

Be it known that I, THEOPHILUS BROWN, a citizen of the United States, residing at Worcester, in the county of Worcester and Commonwealth of Massachusetts, have invented a new and useful Improvement in Transmission-Gearing, of which the following is a specification, accompanied by drawings forming a part of the same, in which—

Figure 1 is a side view of the rear portion of a manure spreader embodying my invention. Fig. 2 is a side view upon an enlarged scale of my improved method of driving the endless movable apron of the spreader. Fig. 3 is a top view, on an enlarged scale, of the ratchet case. Figs. 4 and 5 are views of the same with the cover removed, but showing the cam shaped flanges in different positions. Fig. 6 is a vertical sectional view of the ratchet case, and Figs. 7 and 8 represent the ratchet case with the cover removed, with the cam flanges in position to hold the pawls disengaged throughout their entire movement.

Similar reference letters and figures refer to similar parts in the different views.

My invention relates to an improved transmission gearing by which power is transmitted from a constantly rotating shaft intermittently to a second shaft, and by which means is provided for determining the speed of the second shaft relatively to that of the rotating shaft and also independent means for disconnecting said shafts as desired, and it consists in the construction and arrangement of parts as hereinafter described and pointed out in the annexed claims.

I have shown my improved transmission gearing as applied to a manure spreader to connect the beater shaft and the apron actuating shaft, by which the apron actuating shaft is driven intermittently from the beater shaft, its speed relative to the beater shaft may be regulated as desired and the shafts may be disconnected without influence upon the regulation of speed.

Referring to the accompanying drawings 1 denotes the body of the manure spreader, provided with an endless movable apron 2 forming the bottom for the body, and a rotating beater 3. The endless apron 2 is carried on sprockets on toothed wheels 4 on shafts 5 at either end of the spreader, that at the rear end only being shown. Upon one end of the shaft 5 at the rear of the spreader, is a worm gear 6 which engages a worm 7 upon the lower end of a vertical shaft 8. The shaft 8 is journaled in a box $8^a$ which is supported by a bracket 9 attached to the body 1 by trunnions $8^b$. Attached to the shaft 8 is a shell 10 having internal ratchet teeth 11. Journaled on the upper end of the shaft 8 within the shell 10 is an arm 12, extending diametrically across the shell 10 on each end of which are springs $12^b$ and pawls $12^a$ adapted to engage the teeth 11 and by an oscillating movement of the arm 12 rotate the case 10 and hence the shaft 8 with an intermittent rotary movement. A stud 13 extends from the arms 12 through an opening in the cover of the case 10, and to the upper end of the stud a radial arm 14 is attached connected by a ball and socket joint 15 to a link 16 which is attached to a crank 17 rotated by the revolving beater shaft 18. As the beater shaft revolves, the arm 12 receives an oscillating motion, and by means of the pawls $12^a$ an intermittent rotary motion is imparted to the shaft 8, thereby rotating the worm gear 6 and shaft 5, and slowly advancing the endless apron 2 of the spreader. The shell 10 is provided with a cover 19 which is centered on the shell 10 by the stud 13. The cover 19 is provided with two depending flanges 20 having cam surfaces 21 engaging upwardly projecting spurs 22 on the pawls $12^a$, and arranged to withdraw the pawls from engagement with the ratchet teeth 11.

Fig. 4 shows the interior of the shell 10 with the arm 12 at one end of its movement. Fig. 5 is a view of the same with the arm 12 at the other end of its movement. In Fig. 5 the spurs 22 are represented in engagement with the flanges 20 with the pawls $12^a$ out of engagement with the ratchet teeth 11. The sections 23 of the flanges 20 are concentric with the shell 10 and hold the pawls permanently out of engagement. It is apparent that as the cover 19 is moved in the direction of the rotation of the shell 10, the number of ratchet teeth 11 which the pawls $12^a$ can engage, will be lessened during the entire movement of the arm 12, and while the spurs 22 are in contact with the concentric sections 23 of the flanges 20, the shell 10 and shaft 8 are not rotated by the movement of the arm 12. The position of the cam flanges will therefore determine the movement of the endless apron 2. This rotation of the cover 19 is accomplished by a change feed rod 24 pivotally attached to the cover at 25, and arranged to be operated by the driver of the manure spreader by means of a hand lever at the seat, not shown. I also provide a rod 26 and bell crank 27 connected by a link 28 to a collar 29 on the lower portion of the shaft 8, by which the operator is enabled to move the worm 7 out of engagement with the worm gear 6 which stops the movement of the apron 2 of the spreader. This swinging movement of the worm 7 and shaft 8 is provided for by means of the trunnions 8$^b$ which allows the box 8$^a$ to rock on the bracket 9. By the rotation of the cover 19 as above described, I am also enabled to govern the amplitude of movement of the shaft 8 and consequently the travel of the apron 2, for it is evident since the speed of the beater shaft is constant that the number of teeth between each engagement of the pawls 12$^a$ with the ratchet teeth 11 will determine the amount of movement of the apron, and this number of teeth is determined by the position of the depending flanges 20, with reference to the spurs 22 on the pawls 12$^a$.

I claim:

1. In a transmission gearing, the combination with a rotating shaft and a second shaft driven from said rotating shaft, of an intermediate shaft having one end operatively connected with said driven shaft and at the other end a pawl and ratchet mechanism transversely mounted on said intermediate shaft and arranged to rotate said intermediate shaft with an intermittent movement, means for operating said pawl and ratchet mechanism from said rotating shaft, means for controlling the movement of said ratchet mechanism and with said intermediate shaft pivotally mounted, whereby it may be longitudinally rocked to disconnect it from said driven shaft.

2. In a transmission gearing, the combination with a rotating shaft and a second shaft driven from said rotating shaft, of a swinging shaft with one end operatively connected with said driven shaft, means for swinging said shaft at will to disconnect it from said driven shaft, a pawl and ratchet mechanism transversely mounted on the other end of said swinging shaft, means for operating said pawl and ratchet mechanism from said rotating shaft, arranged to rotate said swinging shaft with an intermittent movement, and means for setting said pawl and ratchet mechanism to vary the speed of rotation of said swinging shaft as desired.

3. In a transmission gearing, an intermediate shaft having one end operatively connected with a shaft to be driven, a shell transversely mounted upon the other end of said intermediate shaft, said shell having internal ratchet teeth, a pawl within said shell arranged to engage said teeth and rotate said intermediate shaft with an intermittent movement, means for oscillating said pawl from a rotating shaft, and a cover for said shell having means for engaging said pawl by the rotation of said cover and thereby determining the number of teeth engaged by said pawl during its oscillating movement.

4. In a transmission gearing, an intermediate shaft having one end operatively connected with a shaft to be driven, a shell transversely mounted upon the other end of said intermediate shaft, said shell having internal ratchet teeth, a pawl mounted on a ratchet arm journaled within said shell, said pawl arranged to engage said teeth and rotate said intermediate shaft with an intermittent movement, means for oscillating said arm from a rotating shaft, and a cover for said shell having a depending cam flange arranged by the rotation of said cover to engage said arm and thereby determine the number of teeth engaged by said pawl during the oscillation of said arm.

Dated this 29th day of December 1906.

THEOPHILUS BROWN.

Witnesses:
PENELOPE COMBERBACH,
RUFUS B. FOWLER.

Copies of this patent may be obtained for five cents each, by addressing the "Commissioner of Patents, Washington, D. C."